United States Patent
Campos et al.

(10) Patent No.: US 12,206,449 B1
(45) Date of Patent: Jan. 21, 2025

(54) HYBRID TELECOMMUNICATION AND SENSING SYSTEMS AND METHODS

(71) Applicant: Cable Television Laboratories, Inc., Louisville, CO (US)

(72) Inventors: Luis Alberto Campos, Superior, CO (US); Zhensheng Jia, Superior, CO (US); Haipeng Zhang, Broomfield, CO (US); Mu Xu, Broomfield, CO (US); Junwen Zhang, Broomfield, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

(21) Appl. No.: 17/503,567

(22) Filed: Oct. 18, 2021

Related U.S. Application Data

(60) Provisional application No. 63/092,764, filed on Oct. 16, 2020.

(51) Int. Cl.
  *H04B 10/08*    (2006.01)
  *H04B 10/077*   (2013.01)

(52) U.S. Cl.
  CPC ..... *H04B 10/0773* (2013.01); *H04B 10/0775* (2013.01)

(58) Field of Classification Search
  CPC ............ H04B 10/0773; H04B 10/0775; H04B 10/0795; H04B 10/0771; H04B 10/0793; H04B 10/07955; H04B 10/071; H04B 10/40; H04B 10/2057; H04J 14/02; H04J 14/0212
  USPC ........ 398/16, 10, 13, 17, 25, 26, 27, 28, 29, 398/30, 31, 32, 33, 38, 79, 135, 136, 137, 398/138, 139, 202, 208, 209, 158, 159
  See application file for complete search history.

(56) References Cited

U.S. PATENT DOCUMENTS

| | | | | |
|---|---|---|---|---|
| 7,174,097 B2* | 2/2007 | Alleston | ............. | H04B 10/296 398/16 |
| 9,960,842 B2* | 5/2018 | Zinevich | ............. | H04B 10/0793 |
| 10,211,920 B1* | 2/2019 | Khaleghi | ......... | H04B 10/25253 |
| 2004/0208430 A1* | 10/2004 | Chin | ................. | H04B 10/0775 385/24 |
| 2012/0106947 A1* | 5/2012 | Wang | .................. | H04B 10/032 398/9 |
| 2014/0037285 A1* | 2/2014 | Perron | .............. | G01M 11/3127 398/21 |
| 2020/0173818 A1* | 6/2020 | Handerek | ............. | G01K 11/32 |

FOREIGN PATENT DOCUMENTS

| | | | | |
|---|---|---|---|---|
| WO | WO-2014167260 A1 * | 10/2014 | ........... | H04B 10/071 |

* cited by examiner

*Primary Examiner* — Hanh Phan
(74) *Attorney, Agent, or Firm* — Josh C. Snider; Snider IP

(57) ABSTRACT

A fiber-optic network that uses as a hybrid telecommunication and sensing system when telecommunication signals and probe signals are transmitted across a shared fiber strand in either a co-propagated or counter-propagated direction is disclosed. Probe signals generated by a sensing termination system and/or by one or more end devices are used to analyze conditions affecting network hardware and/or events occurring within the fiber distribution area.

21 Claims, 15 Drawing Sheets

HYBRID TELECOMMUNICATION AND SENSING SYSTEMS AND METHODS

CROSS-REFERENCE TO RELATED APPLICATIONS

This application claims the benefit of and priority to U.S. Provisional Patent Application No. 63/092,764, filed Oct. 16, 2020, which is hereby incorporated by reference in its entirety.

STATEMENT REGARDING FEDERALLY SPONSORED RESEARCH

None.

BACKGROUND

Distributed fiber optic sensing (DFOS) has attracted significant attention globally for measuring strain, temperature, and vibration over tens of kilometers by utilizing the backscattered Rayleigh, Raman, or Brillouin signals in a fiber optic strand. DFOS provides a promising way to turn an optical fiber into thousands of sensing elements and to monitor real-time parameters with a single interrogator, making it a very cost effective and non-intrusive solution. Nonetheless, a DFOS system requires a dedicated fiber optic strand to preserve probe signal qualities and system capabilities. Thus, achieving pervasive sensing in a geographical region requires building a dedicated network with thousands of individual sensors along dozens of kilometers of infrastructure to achieve real-time pervasive monitoring, which is an impractical solution requiring significant labor and cost.

The cost and complexity of building a fiber optic network dedicated to sensing limits the practicality and feasibility of DFOS. To scale the feasibility of DFOS, leveraging existing fiber optic telecommunication infrastructure and achieving coexistence between telecommunication signals and the sensing system signals must be achieved.

SUMMARY

Fiber network infrastructure that has been deployed in campus, city, regional or local settings can be leveraged not only in communications but also for sensing applications. With novel probing signal design and data analytics, the telecommunication fiber environment can become a hybrid telecommunication-sensing platform that can be designed for granular discovery of diverse events that occur throughout the fiber coverage area. As such, this disclosure describes:

Coexistence between DFOS and telecommunication signals achieved through a combination of novel probing signal design and artificial intelligence/machine learning (AI/ML) based analytics Conversion of an entire communications network into a sensing system Higher resolution, better sensitivity and coverage achieved through data analytics of the combined distributed sensing information A characteristic of deployed fiber optic networks and facilities is that they have extensive and granular coverage which extends from common distribution/aggregation centers. This topology of many fiber strands extending in multiple directions from such distribution/aggregation centers enables the implementation of a powerful optical sensing strategy. The sensing strategy includes four key elements that augment traditional optical sensing techniques, they are:
1) Novel Design and Generation of Optical Probe Signals
2) Sensing Coverage Ubiquity
3) Coordination and Correlation of Probe Signals for Enhanced Sensitivity
4) Artificial Intelligence/Machine Learning (AI/ML) Optimization of Probe Signals for Event Specific Sensing In addition to the environment discussed here, some of the knowledge gathered could also be applied to other environments where fiber is embedded, for example, in buildings, ships, and aircraft.

A fundamental feature of the methodology described here is that existing fiber networks, built for telecommunication purposes, can simultaneously be used to implement an optical sensing system. Test results described in this disclosure show that with proper signal design and deployment guidelines, optical probe signals that are used for seismographic sensing, for example, can coexist with traditional telecommunication signals sharing the same fiber strand and operating at different wavelengths.

In an aspect, a method of using a telecommunication fiber-optic network as a probe comprises transmitting probe signals and telecommunication signals on a shared fiber optic strand of the fiber-optic network, receiving the probe signals at a detector, and analyzing data from the detector to monitor a condition affecting the fiber-optic network.

In an embodiment, the probe signals are generated by a probe signal generator within a sensing termination system or by one or more end devices of the fiber-optic network.

In an embodiment, the probe signals and the telecommunication signals are co-propagating. In another embodiment, the probe signals and the telecommunication signals are counter propagating.

In an embodiment, the telecommunication signals and the probe signals are transmitted on a shared optical channel, such as a shared wavelength band of the electromagnetic spectrum (e.g., the conventional band, C-band, 1530 nm to 1565 nm).

In an embodiment, the probe signals comprise a plurality of probe signals transmitted at a specified time, such as simultaneously or sequentially.

In an embodiment, the data from the detector represent backscattering of the probe signals, probe signals received at an end device, probe signals received at a hub from an end device, or a combination thereof.

In an embodiment, a method of using a telecommunication fiber-optic network as a probe further comprises coordinating timing, physical path, overall power level, pulse duration, pulse peak power, and wavelength of each of the probe signals. In an embodiment, parameters on the probe signals are adjusted based on artificial intelligence or machine learning models.

In an embodiment, the condition affecting the fiber-optic network is internal to the fiber-optic network and/or external to the fiber-optic network. For example, the condition may be selected from the group consisting of temperature, strain, vibration, refractive index, electromagnetic energy, tensile force, compressive force, physical movement, light scattering, fiber-optic cable damage and combinations thereof.

In an embodiment, a method of using a telecommunication fiber-optic network as a probe further comprises identifying a characteristic of an event affecting the fiber-optic network, the characteristic comprising location, type, source, intensity, duration, and combinations thereof.

In an aspect, a hybrid telecommunication and sensing (HTS) system for monitoring a condition affecting a fiber-optic network having a hub connected to a plurality of end devices by a fiber optic cable comprises a probe signal generator transmitting probe signals on a fiber strand of the fiber-optic network and a telecommunication signal transceiver transmitting telecommunication signals on the fiber strand used to transmit the probe signals.

In an embodiment, an HTS system further comprises a switch and router, a local or centralized probe signal controller/processor, a circulator, a splitter, a multiplexer/demultiplexer, and/or a probe signal replicator.

In an embodiment, an HTS system further comprises a probe signal receiver receiving backscattered probe signals.

In an embodiment, an HTS system further comprises a probe signal receiver receiving data from one or more of the plurality of end devices through an out-of-band channel.

In an aspect, a non-transitory computer-readable medium has a plurality of non-transitory instructions executable with a processor for utilizing a fiber-optic network as a hybrid telecommunication and sensing system, the plurality of non-transitory instructions being executable for transmitting probe signals and telecommunication signals on a shared fiber optic strand, receiving the probe signals at a detector, and analyzing data from the detector to monitor a condition affecting the fiber-optic network.

In an embodiment, the plurality of non-transitory instructions are further executable for transmitting control signals associated with the probe signals in an out-of-band channel. In an embodiment, the control signals instruct an end device of the fiber optic network to transmit the probe signals.

In an embodiment, the received probe data is received from an out-of-band channel.

In an embodiment, the plurality of non-transitory instructions are further executable for coordinating timing, physical path, overall power level, pulse duration, pulse peak power, and wavelength of each of the probe signals.

In an embodiment, probe signals and telecommunication signals are transmitted at different wavelengths. In some embodiments, the probe signals and telecommunication signals are transmitted on the same optical channel, such as the conventional band.

BRIEF DESCRIPTION OF THE DRAWINGS

Illustrative embodiments of the present invention are described in detail below with reference to the attached drawings.

DETAILED DESCRIPTION

Figure 1:
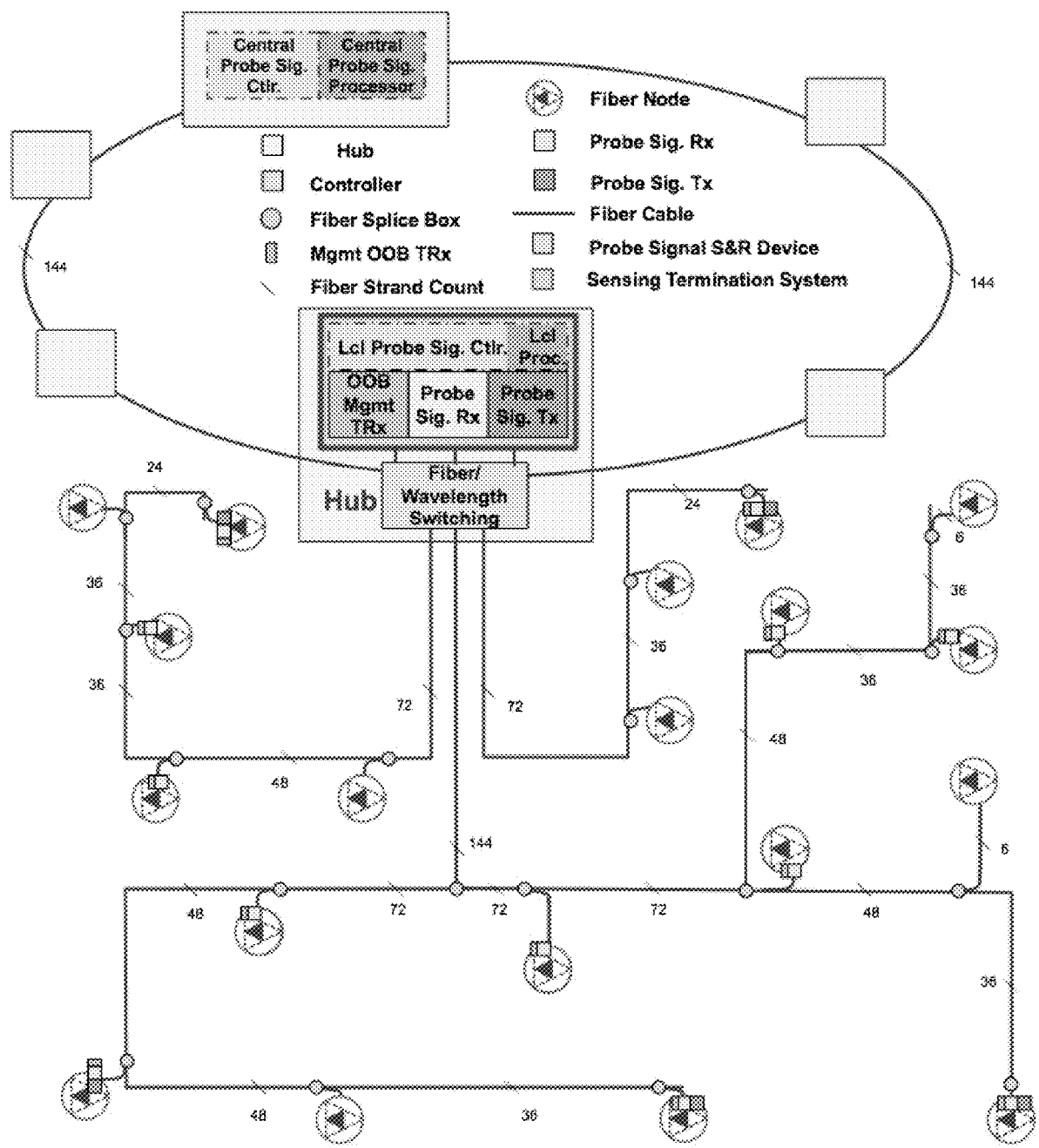
FIG. 1 shows a hybrid telecommunication-sensing system within a fiber access network, according to an embodiment.

In general, the terms and phrases used herein have their art-recognized meaning, which can be found by reference to standard texts, journal references, and contexts known to those skilled in the art. The following definitions are provided to clarify their specific use in the context of this description.

As used herein, the term "network" refers generally to any type of telecommunications or data network including, without limitation, hybrid fiber coaxial (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the terms "processor" and "computer" and related terms, e.g., "processing device", "computing device", and "controller" are not limited to just those integrated circuits referred to in the art as a computer, but broadly refer to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein "dark fiber" refers to pre-existing fiber that is not yet utilized or lit.

As used herein, "an event" refers to a natural or man-made phenomenon occurring within the detection range of a hybrid telecommunication and sensing system. An event triggers measurable conditions that can be used to characterize the event's location, type (e.g., earthquake, drilling, blast), source (e.g., natural, man-made, volcano, missile), intensity, duration, and combinations thereof.

As used herein "a condition" refers to a physical parameter used to quantify an event within the detection range of a hybrid telecommunication and sensing system. Exemplary conditions include temperature, strain, vibration, refractive index, electromagnetic energy, tensile force, compressive force, physical movement, light scattering, fiber-optic cable damage and combinations thereof.

As used herein "internal" refers to a location within hardware forming part of the fiber-optic network. "External" refers to a location within a fiber area, but not part of the hardware forming the network, where events at the location are detectable by probe signals on the fiber-optic network.

As used herein, "co-propagation" refers to two signals or types of signals propagating across a transmission medium in the same direction (from point A to point B), whereas "counter propagation" refers to two signals or types of signals propagating across a transmission medium in opposite directions (one from point A to point B, the other from point B to point A).

As used herein, "an optical channel" refers to a portion of the electromagnetic spectrum, such as a dedicated wavelength band in the telecommunication spectrum. An exemplary optical channel would be the conventional band (C-band, 1530 nm to 1565 nm).

Fiber Sensing System

FIG. 1 shows an exemplary hybrid telecommunication-sensing system within a fiber access network. At different scales, but having similar architectures, would be metropolitan, municipal, regional, campus-wide or local networks. Common to all scenarios, would be that such networks have a central location from where fiber strands extend in multiple directions in order to achieve extensive coverage over a fiber serving area.

Figure 2:
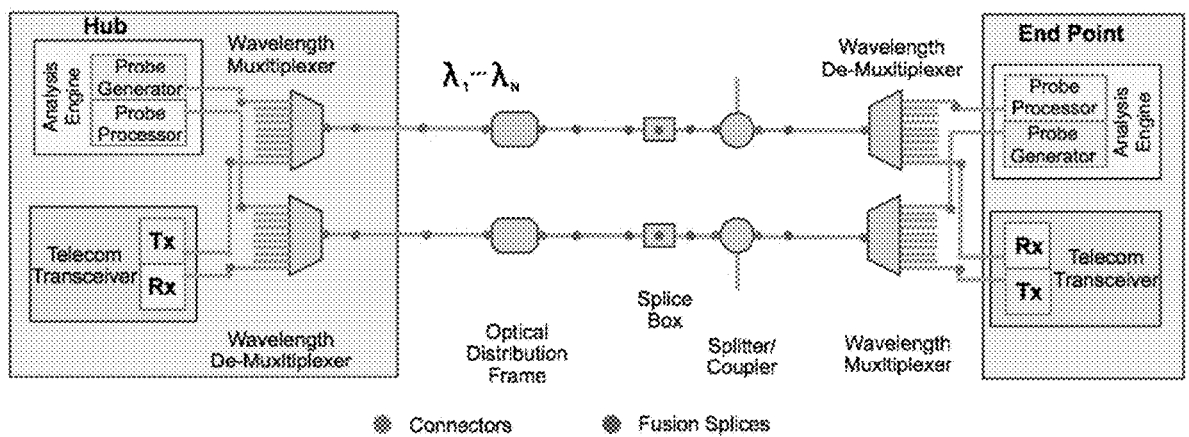
FIG. 2 shows typical optical elements between a hub and end device, according to an embodiment.

In a typical fiber network, there is a central location (aka hub) from which bundles of fiber strands extend in multiple directions. Actual fiber network implementations may have hundreds of fiber strands that are bundled together in tubes which are aggregated in sheaths and conduits, which extend from a common central location. Within each fiber bundle there can be telecommunication and/or sensing signals that can occupy one or more wavelengths within the transmission wavelength spectrum of fiber. As these fiber bundles traverse a serving area, these fiber paths bifurcate multiple times so that fewer fiber strands remain in a bundle but the resulting number of bundles increases and so does areal coverage. At these bifurcation points from where a larger fiber count bundle gets split into multiple smaller fiber count bundles, the fiber strands are fusion-spliced to minimize loss and enable transmission continuity. This describes an end-to-end fiber connectivity from hub to end point. In some cases, devices that enable a one-to-many fiber connectivity are used, such as a splitter, a coupler, or a demultiplexer. Special considerations are required if sensing is to take place through some of these devices. FIG. 2 highlights a point-to-point fiber segment with optical devices that could potentially be traversed between a hub and end device.

To enable leveraging of the fiber network as a sensing network, a common probe generation system that is capable of delivering sensor signals/probe signals to any of the fiber paths that extend from the central location is described. This enables expanded coverage of the DFOS system and reduces the cost of the system by centralizing probe generation.

Design and Generation of Optical Probe Signals

Optical probe signals are designed and generated to be specific to the nature and characteristics of an event to be detected. For example, by leveraging the probe signal design and knowledge of the fiber topology, fiber segment lengths as well as the exact time probe signals are launched, the system can achieve high resolution and accuracy in detecting events.

Sensing Coverage Ubiquity

Leveraging the telecommunication fiber infrastructure for sensing enables ubiquitous coverage, but the sensitivity and accuracy of detection is a function of the distance between the event and the fiber. Here, proximity of fiber infrastructure to be detected events and the ability to successfully assess the type of event and parameters that characterize such an event are evaluated. The results allow for a determination of the amount of fiber infrastructure that needs to be lit with probe signals to establish coverage for a particular event type.

Coordination and Correlation of Probe Signals for Enhanced Sensitivity

Greater sensitivity can be achieved through correlation of multiple probe signal responses from probe signals sent through different fibers. The ubiquitous coverage of a telecommunication fiber infrastructure enables multiple sensor responses to a single event. Here, data analytics and digital signal processing techniques are used to leverage multiple synchronized probe signal responses to events to improve the systems' sensing sensitivity and accuracy. The amount of improvement per additional in-flight probe signal helps to determine how many probe signals in-flight are optimal.

AI/ML Optimization of Probe Signals for Event Specific Sensing

Probe signals particular to an event can be modified in real time, using artificial intelligence (AI) and machine learning (ML) techniques, to extract further information about the event benefiting from a posteriori knowledge of what the event was. This also enables the system to train itself and improve for subsequent analysis.

SUMMARY

An approach to the implementation of an intelligent sensing system leveraging existing fiber communication infrastructure is described. The intelligent sensing system leverages topology, flexible design and generation of probe signals, as well as correlation of probe signal responses supported by AI and ML. The multiplicative performance factor from a coverage perspective provided by the multitude of fibers as well as the improved sensitivity from coordinated probe signal detection are integral to this approach. The introduction of AI/ML in the design of the system as well as the practical leveraging of existing fiber infrastructure can lead to significant tools in accurately sensing and discriminating events that are present in civilian and military use case scenarios.

Experimental Coexistence Investigation of Optical Fiber Seismic Sensing and Coherent Optical Communication Systems Among DFOS, distributed acoustic sensing (DAS) is a state-of-the-art optical fiber sensing technique, which utilizes coherent optical time-domain reflectometry to accurately measure the phase and amplitude of vibrations along an optical fiber. In a wide range of potential applications, DAS has created a paradigm shift in applied geophysics by enabling seismic measurements at high frequency, large distances, and fine spatial sampling resolution with a reasonable cost.

Recently, several demonstrations of seismic monitoring utilizing the DAS technique have been reported over installed dark fiber [1,2,3,4]. However, employing dark fiber here means a single wavelength channel is used for an individual sensing application, which is very inefficient and uneconomical for wide scale deployment of sensing networks. Moreover, the huge capacity demand for optical fiber has caused a shortage in certain regions and this fiber shortage will only intensify as fiber demand for business and wireless backhaul increases and fiber deep architectures become prevalent. In most cases, fiber retrenching is extremely costly and to be avoided. It is therefore critical to use the optical fiber infrastructure more efficiently. The coexistence of both data and sensing information on the same pervasive fiber optical transmission network infrastructure offers the most powerful solution by additionally turning the networks into distributed sensors. However, the fact is that sensing signals based on chirped optical pulses have a much higher power density in a short period of time than conventional coherent optical signals, causing them to have a much greater impact on the refractive index for nonlinear effects such as cross phase modulation (XPM) and four-wave mixing (FWM).

In this work, we explore the performance challenges and perform experimental measurements on this hybrid system between the high-fidelity distributed acoustic sensor (HDAS) channel and 100G/200G coherent optical channels to analyze the coexisting requirements, including spectrum allocation, power level control, sensing pulse configuration, relative direction of data and sensing signals and minimal sensor and data channel spacing in dense wavelength division multiplexing (DWDM) systems. The suitability of coexistence conditions and the guidance of two system adjustment for broader coexistence scenarios are provided for the first time.

High-Fidelity Distributed Acoustic Sensing (HDAS) Operation Principle

The HDAS operation is based on chirped-pulse DAS [4,5]: a modified version of phase-sensitive optical time domain reflectometry ($\phi$OTDR) using chirped pulses (CP-$\phi$TDR). In its simplest form, the technique relies on launching coherent optical pulses into a fiber and monitoring the (CW) Rayleigh backscattered pattern via the same fiber end. Perturbations along the fiber (temperature, strain/vibrations or refractive index variations) change the optical path distance between the fiber scattering centers, thus changing the resulting backscattered interference pattern. Since these changes can be compensated by a frequency detuning of the pulse central frequency, the use of linearly chirped pulses maps these perturbations into a local temporal delay of the optical trace, that can be monitored with direct detection.

Figure 3A:
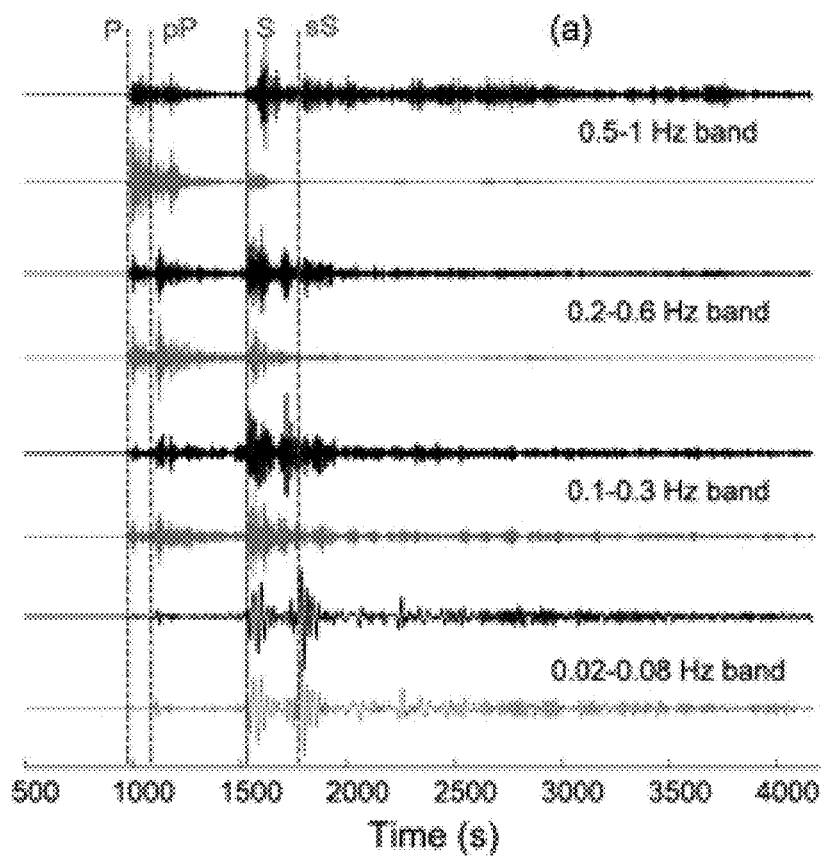
FIG. 3A shows a comparison of DAS records of an earthquake with co-located conventional seismometer in a few frequency bands between 0.02 Hz and 1 Hz

The working principle is therefore fundamentally different from traditional DAS, with important advantages. Owing to the use of direct detection, the technique is intrinsically immune to blind spots caused by interference fading, as well as polarization fading, whilst maintaining a linear and higher sensitivity to applied perturbations. The acoustic noise variability from point to point can therefore be orders of magnitude below those of traditional coherent detection $\phi$OTDR [4], while maintaining relaxed specs on detection and laser requirements. Typical operation in seismic sensing for long fiber (i.e., >~20 km) yields pulses with few kHz repetition rate (i.e., acoustic sampling) and 10 ns-100 ns width (i.e., 1 meter-10 meters spatial resolution) with a peak power that is limited to ~200 mW, due to the onset of nonlinearities during pulse propagation. Current applications of DAS to pre-existing telecom dark fibers in urban environments have demonstrated remarkable sensitivity and data fidelity. As an example, FIG. 3A shows the DAS records of the Aug. 19, 2018 magnitude 8.2 Tonga earthquake on a DAS array 8000 km away in the city of Pasadena, California [2]. Comparison of the travel times and waveforms with co-located conventional seismometers shows good consistency over multiple frequency bands. Therefore, HDAS has proven to be able to convert telecom dark fibers to highly sensitive geophysical sensors.

Coexistence Testing Setup

Figure 3B:
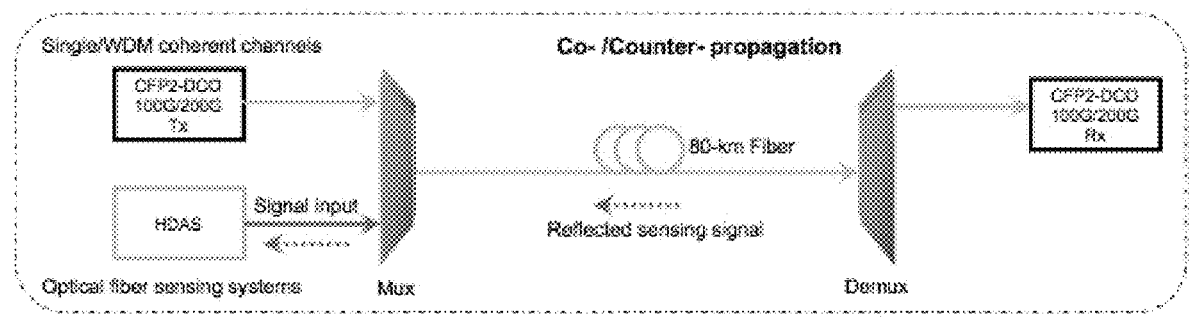
FIG. 3B shows a coexisting optical system experimental setup, according to an embodiment.
Figure 3C:
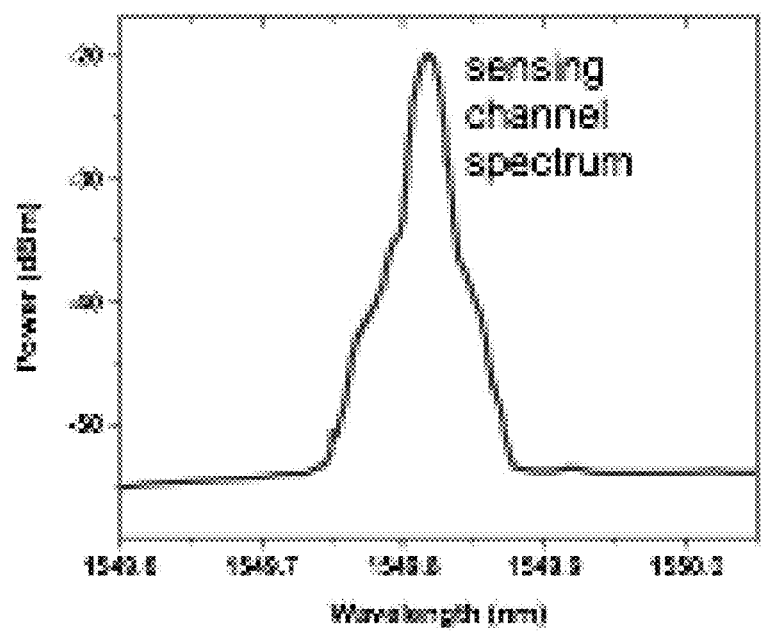
FIG. 3C shows an individual sensing spectrum.
Figure 3D:
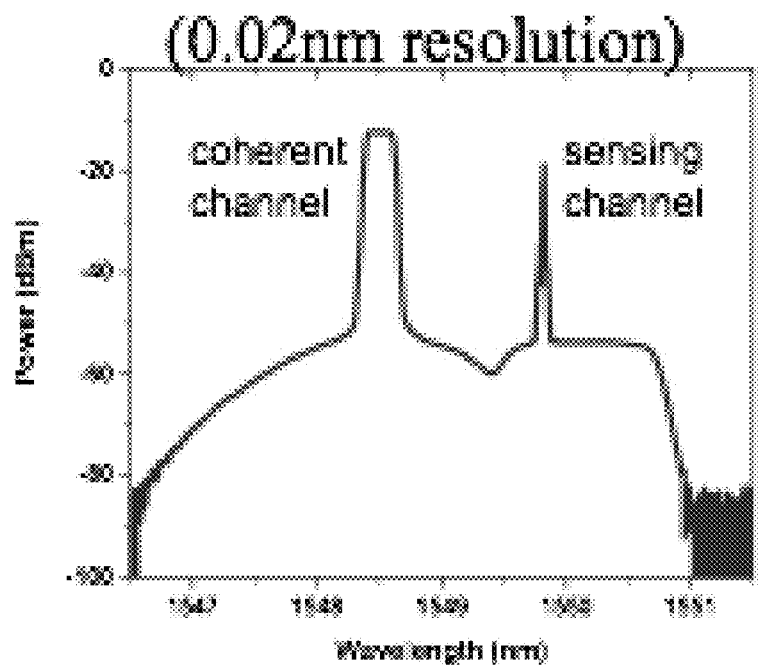
FIG. 3D shows coexisting spectra with a single coherent channel.
Figure 3E:
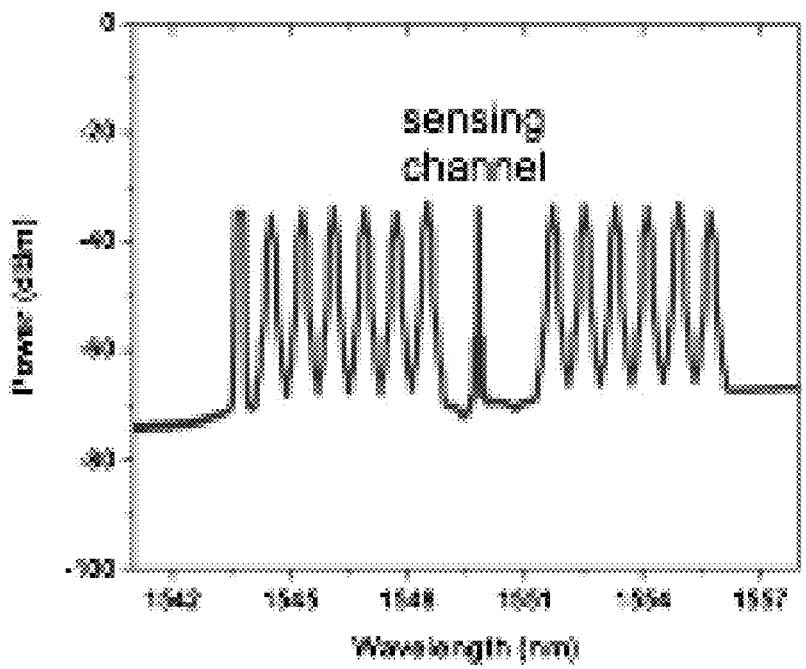
FIG. 3E shows coexisting spectra with WDM channels.

The experimental setup for the coexisting fiber sensing system and data configuration is shown in FIG. 3B. The CFP2-DCO transceiver module is employed for single coherent channel connection [6]. It supports a 100 Gb/s client data rate using 31.4 Gbaud PM-QPSK and a 200 Gb/s client data rate using 31.4Gbaud PM-16QAM. In the case of WDM operation, multiple loading coherent channels are generated via discrete coherent setups that consist of external-cavity lasers (ECLs), quad-parallel modulators, integrated RF drivers, and an arbitrary waveform generator (AWG). The HDAS pulses had a repetition rate of 1 kHz, an optical intensity profile of a supergaussian with FWHM of 20 ns-100 ns (1E-4 duty cycle) and 500 MHz frequency (chirp) content. The system was calibrated to ensure that the pulses' peak powers (software programable) had between 20 mW-200 mW when entering the fiber, i.e., after accounting for the multiplexer losses. Considering a typical-82 dB/ns fiber Rayleigh backscattering coefficient, the generated CW backscattering pattern is expected to have an average power of ~10 nW-100 nW, before accounting for fiber propagation losses. The generated optical spectrum of the high-power chirped pulses is shown in FIG. 3C. The communication channels and the fiber sensing signal are combined via the optical multiplexer and then travel through the same fiber. The corresponding optical spectra for single channel and WDM operation are shown in FIG. 3D and FIG. 3E respectively. Both co-propagation and counter-propagation coexisting [7] testing were carried out to investigate the impact of nonlinearity crosstalk.

Experimental Results and Analysis

Figure 4A:
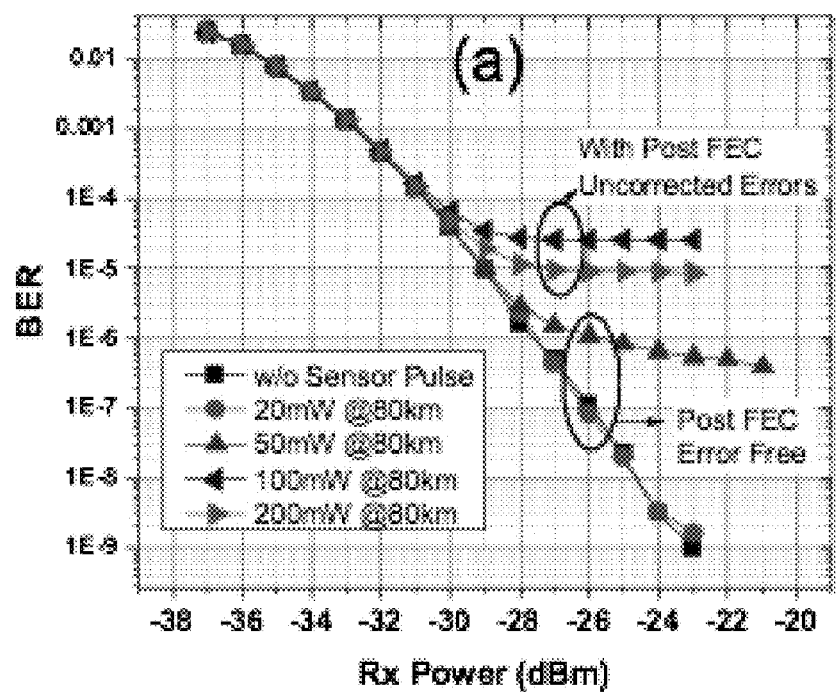
FIG. 4A shows coherent channel pre- and post-FEC BER results in a coexisting setup single-channel PM-QPSK with sensing signal.
Figure 4B:
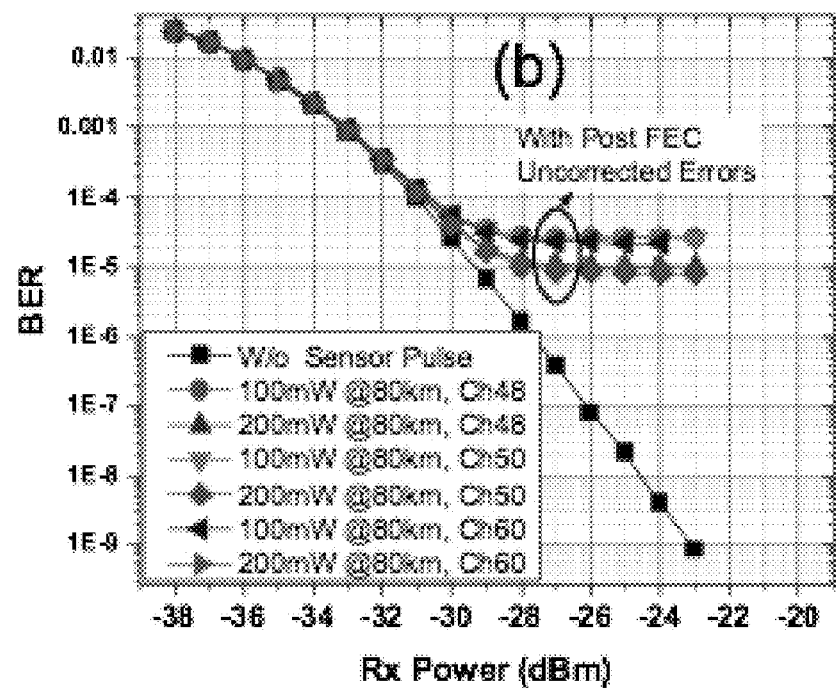
FIG. 4B shows coherent channel pre- and post-FEC BER results in a coexisting setup PM-QPSK WDM channels with sensing signal.
Figure 4C:
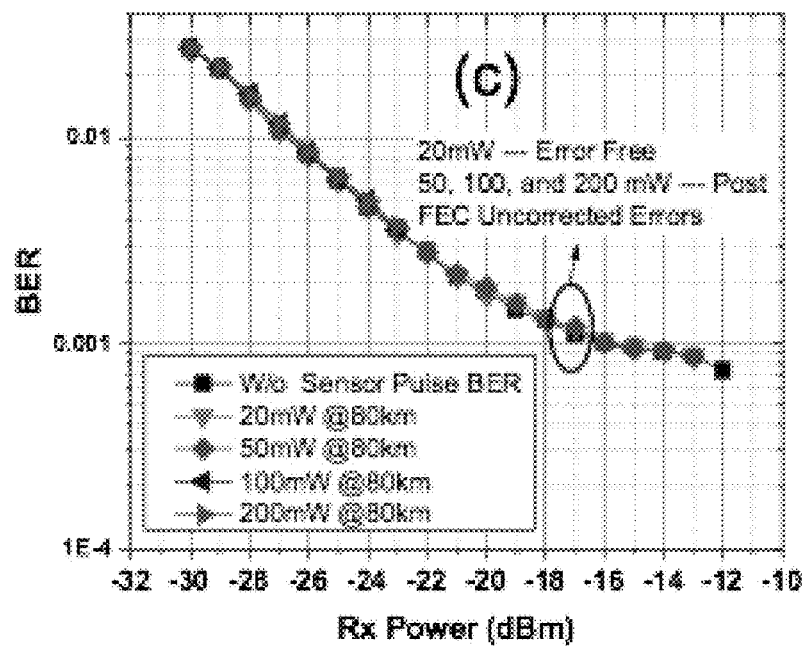
FIG. 4C shows coherent channel pre- and post-FEC BER results in a coexisting setup single-channel PM-16QAM with sensing signal.
Figure 4D:
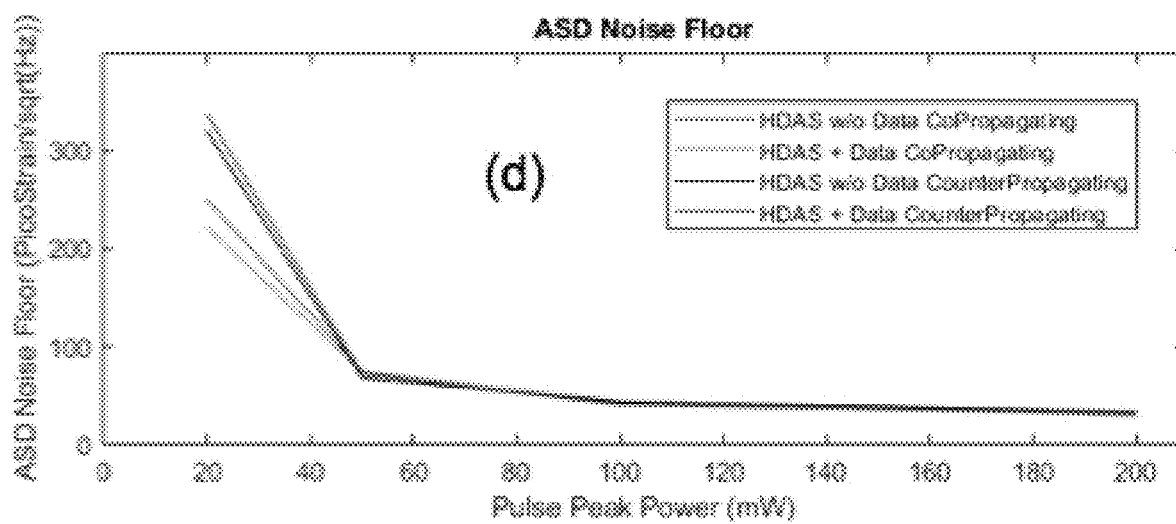
FIG. 4D shows coherent channel pre- and post-FEC BER results in a coexisting setup HDAS acoustic noise floor for pulses of 100 ns FWHM with peak powers of 20/50/100/200 mW.

FIGS. 4A-4D present the experimental results over 80-km fiber transmission distance. FIG. 4A shows coherent channel pre- and post-FEC BER results in a coexisting setup single-channel PM-QPSK with sensing signal. FIG. 4B shows coherent channel pre- and post-FEC BER results in a coexisting setup PM-QPSK WDM channels with sensing signal. FIG. 4C shows coherent channel pre- and post-FEC BER results in a coexisting setup single-channel PM-16QAM with sensing signal. FIG. 4D shows coherent channel pre- and post-FEC BER results in a coexisting setup HDAS acoustic noise floor for pulses of 100 ns FWHM with peak powers of 20/50/100/200 mW.

Because of the fiber nonlinearity crosstalk introduced by ultra-high instantaneous sensing pulse power, error floors were observed for the PM-QPSK signals FIG. 4A and FIG. 4B at the level of between 1E-4 and 1E-6 of BER. Regarding the PM-16QAM signals in FIG. 4C, the crosstalk-introduced error floor was not observed due to the lower back-to-back sensitivity curves (around the level of 1E-3 of BER). Channel spacing (from ITU grid 48 to 60) and differential and non-differential configurations of QPSK signals were also carried out in the experiment.

As for the fluctuations of HDAS performance (characterized by acquiring 1 minute of HDAS acoustic signal) for different coexisting scenarios, these were observed to be negligible. The acoustic noise floor remained constant (and consistent with HDAS expected instrumental noise: an amplitude spectral density (ASD) of a few tens of pε/√Hz) for all combinations. An example of such characterization is presented in FIG. 4D. Note that for the case of 20 mW peak power, fluctuations of instrumental noise floor of up to 3 dB were recorded owing to the existence of random outliers (owed to the HDAS low power of operation of the system and additional multiplexer losses), but, in any case, these were random and uncorrelated to the data signals.

The summarized results of coexistence measurement are shown in Table 1. For each case, the pre-FEC BER average and post-FEC error count over 1-minute intervals were read from the transceiver. Long-term stability after 80-km transmission was tested by monitoring BER before and after FEC as well. It is noted that counter-propagation works for all different testing scenarios while co-propagation has a strict requirement in terms of pulse power and duration. The cases that are not allowing coexistence means the uncorrected signal blocks appear and post-FEC errors exist.

TABLE 1 coexistence summary for PM-QPSK/16QAM signals

| Transmission Direction | PM-QPSK | PM-16QAM |
|---|---|---|
| Co-propagation | Allowed coexistence: (25 mW, 100 ns), (50 mW, 100 ns), (75 mW, 20 ns) NOT allowed coexistence: any pulse duration with power >=100 mW | Allowing coexistence: (25 mW, 100 ns) NOT allowed coexistence: any pulse duration with power >=50 mW |
| Counter-propagation | Allowed coexistence for all testing scenarios | |

CONCLUSION

The experimental investigations of the coexistence between the high-fidelity distributed acoustic sensor (HDAS) channel and 100G/200G coherent optical channels over 80-km fiber have been presented. Multiple measurements including power level, pulse duration, and relative transmission direction have been carried out to determine successful coexisting conditions. This work offers a powerful solution of turning the telecommunication network into distributed sensors with efficient use of optical fiber infrastructure, making sensing ubiquitous, always available, and practical.

REFERENCES

[1]. Z. Zhan, Seismological Research Letters 91, no. 1, (2019).
[2] M. R. Fernández-Ruiz, APL Photon. 5, 030901 (2020).
[3] E. F. Williams et al, Nat Commun 10, 5778 (2019).
[4] M. R. Fernández-Ruiz et al, Sensors, 19, 4368 (2019).
[5]. J. Pastor-Graells et. al, J. Lightwave Technol., vol. 35, no. 21, pp. 4677-4683, (2017).
[6] Z. Jia et al, OFC 2020, paper Th3A.2.
[7] G. A. Wellbrock et al, OFC 2019, paper Th4C.

Intelligent Optical Sensing System and Protocol

A hybrid telecom and sensing system is described where telecommunication signals and sensing signals coexist on the same fiber. This system manages operation over single or multiple fiber strands over multiple hubs and/or central offices within an access network environment. The sensing signals are carried over individual optical carriers or are embedded as part of the coherent optical signals. Other signals coexisting with these sensing and coherent telecom signals include intensity modulated, direct detected (IM-DD) and analog optical signals. In addition, management signals that exist separately (Out of Band) or that leverage the existing telecommunication signals (In-Band) are used to control and manage the system. Intelligent control of probe signals results in a cost-effective use of optical wavelength resources with only an incremental implementation cost over that of a telecommunication network. Through an intelligent protocol, the system flexibly accommodates all types of optical sensing signals by applying coexistence rules conditioned by the environment and the other optical carrier tenants residing on the same fiber. The system also uses multiple modes of operation that leverage remote end devices that help in acquiring sensing data as well as operation modes where no remote end devices are used to capture sensing data.

BACKGROUND

One of the challenges of optical sensing systems is that they have traditionally used an entire fiber strand exclusively dedicated to the sensing system. This results in an expensive implementation and is not practical for wide scale deployment of sensing networks. With coordinated control and management of the sensing and telecommunication signal parameters, these two signal type systems can coexist on the same fiber. If the sensing system is engineered to take advantage of the fiber network architecture, in particular the central distribution location enjoyed by hubs and central offices, it can maximize coverage and reach, and minimize implementation costs.

Hybrid Telecom-Sensing System

The hybrid telecom-sensing system elements have different functions and are strategically placed within the fiber network topology depending on these functions and the sensing tasks they are intended to conduct. There are three element types that comprise the hybrid telecom-sensing system: 1) the sensing termination system, 2) the probe signal switching and routing device, and 3) the probe signal end device. In some embodiments, there is an additional centralized termination system where some of the functions of a disaggregated sensing termination system are centrally deployed. FIG. 1 shows the hybrid telecom-sensing system within a metro and access network environment.

The hybrid telecom-sensing system uses 3 channels, one is the sensing channel, a second is the telecom channel, and a third is the OOB management channel. The sensing channel consists of selected wavelengths through which the probe signals are transmitted. The telecom channel is the channel that is used to carry telecom signals. The telecom channel can also carry probe signals embedded within the telecom signals which, aided by some processing, can be used for sensing. The telecom channel also carries In-Band management and control signals within the telecom signals. The third channel is the Out-of-Band management channel that uses a separate wavelength and exclusively carries management and control information.

The elements within the telecom-sensing system, depicted in the access network of FIG. 1, and their sub-systems are also depicted in detail to describe better the roles each element and sub-system plays within the sensing network.

PS-STS—The probe signal sensing termination system that is typically located in a hub or central office where optical fibers aggregate or terminate in an access network, comprises the following subsystems:

- A probe signal controller/generator that executes the sensing routines. It is the entity that generates the different types of probe signals and schedules and delivers these probe signals, as well as the control signals, to the switching and routing device so that these probe signals are directed to the selected fibers at the desired wavelengths based on the control information.
- A probe signal processor/analyzer that receives the sensing signal from the probe signal receiver after it has traversed the network being sensed (reflected probe signal or from a remote probe signal transmitter). In addition, the probe signal analyzer receives, through the management sub-system, the signal captured from remote sensors to process and analyzed the signals. The signals that have been remotely captured could have been partially analyzed at the remote location so that only an abbreviated representation of the captured signals could also be received.
- A probe signal transmitter, generates the optical probe signal and transmits it at the time, power level, and wavelength indicated by the controller generator.
- A probe signal receiver, receives the optical probe signal and digitizes capture. It sends the capture to the processor/analyzer for further processing.
- An In-band (Integrated probing function) or Out of Band telecom management element and transceiver (embedded probe)

PS-S&R—The probe signal switching and routing devices are where fiber and wavelength switching or routing take place under the commands of the controller within the termination system. Some probe signal routing devices could be integrated with the Sensing Termination System. These commands are internal and in some cases the probe signal and routing devices could operate stand-alone where the commands are carried through the OOB management channel. The use of a fiber switching-and-routing device allows the system to have one generator shared among multiple fibers and wavelengths resulting in a low cost implementation compared to dedicated peer-to-peer (P2P) sensing systems with one probe signal generator per fiber link.

SS-ED—The standalone sensing end devices are optional and function as a counterpart to the sensing termination system. An SS-ED may include some of the following subsystems.

- A probe signal receiver that receives the probe signals from the
- Probe signal transmitter
- In-band (Integrated probing function) or OOB telecom transceiver (embedded probe)

ES-ED—An embedded sensing end-device is not a physically distinct device but is the functionality implemented within a telecom transceiver that serves as collector of data that is processed to extract sensing information. In a coherent telecommunication system, information can be derived from parameters such as the MIMO coefficients, power levels, codeword error rates, changes in state of polarization, and other parameters.

Probe Signals

In the systems there can be two types of probe signals, explicit or derived. Derived and explicit probes signals may use different wavelengths depending on telecommunication and sensing needs.

DPS—Derived probe signals are generated from the information that can be extracted from traditional telecommunications signals for the purpose of sensing the environment through which information traverses. Since traditional telecom signals have not been designed for sensing, only limited sensing information may be obtained. Telecom signals could be considered sub-optimal probe signals. When telecom signals are received, their characteristics are analyzed and compared to what the undistorted signal would have looked like, so that events and conditions along the fiber transmission path can be inferred. Nevertheless, since a great number of telecom signals are transmitted on the same fiber at different wavelengths and many times at different power levels, correlation between same and different fiber strand telecom signals can be leveraged to derive sensing information.

EPS—Explicit probe signals are signals that are carried over the sensing channel and are designed for particular sensing tasks.

Figure 5:
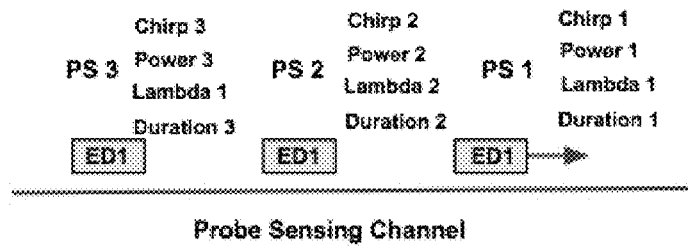
FIG. 5 shows an exemplary sequence of diverse probe signals targeted for end device 1.

FIG. 5 shows an example of a sensing channel carrying explicit probe signals.

From the flexibility in type of probe signals that can be scheduled within a probe channel, varying parameters of the probe signals can result in specific characterization of the channel. Parameters of probe signals will depend on the type of information one is trying to sense such as high/low frequency vibration, temperature changes, electromagnetic pulses, tensile/compressive forces, movement (i.e wind), light scattering phenomena, etc. In addition, the sensing system becomes a very granular mechanism of pinpointing problems in the channel such as water in fiber, poor connectorization, cracks and cuts in fiber, higher attenuation fiber segments, etc.

The probe signals are multiplexed in time and transmitted over a probe sensing channel. Linear characterization can take place by sending the same power level probe signals that are captured by remote end-devices. Non-linear characterization of a channel can be obtained by generating a sequence of probe signals of increasing power levels.

Communication between probe system elements can leverage an out-of-band or in-band management coordination system.

Probe Controller/Processor

The probe controller/processor has the functionality/responsibility of planning which fibers and end devices will participate in the probing/sensing session. The probe controller/processor also determines what type of probe signals are needed for the different fibers and the different end devices. In addition, the probe controller determines which end devices need to generate and send probe signals back to the probe signal sensing termination system and which end devices send reflection captures that probe signal generating end devices send back through the management channel.

Figure 6:
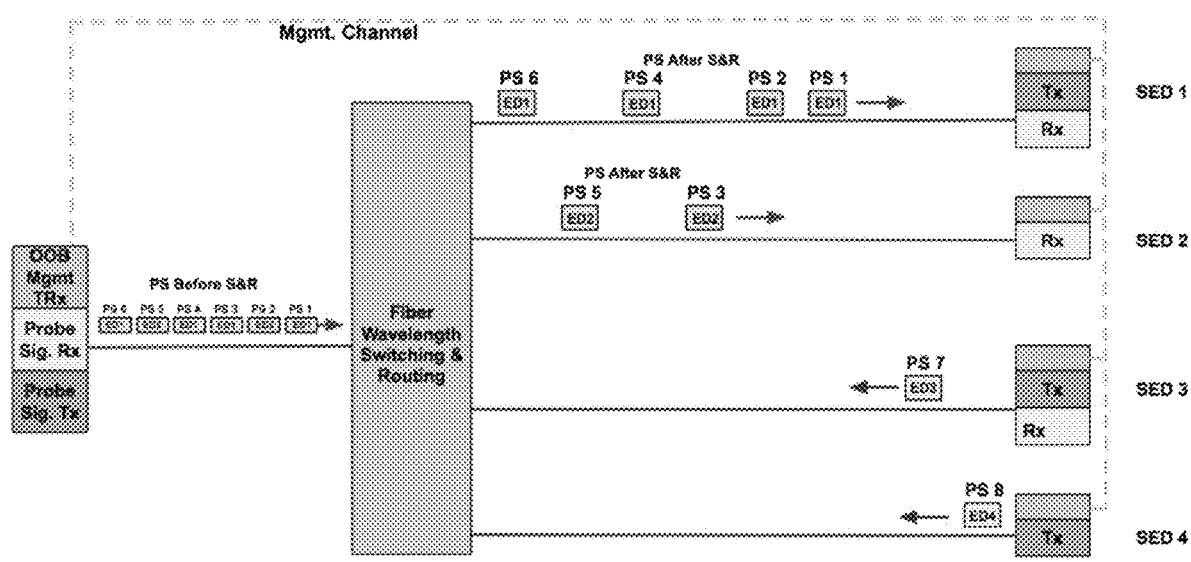
FIG. 6 shows exemplary communication options between a termination system and end devices, according to an embodiment.

Within the probe controller/processor, the information related to probe signal transport using the probe sensing channel, is governed and controlled by the probe sensing protocol (PSP), the remainder of the information, not intended for use over the sensing channel, is communicated using the management channel via traditional communication signaling (FIG. 6).

Probe Sensing Protocol

A probe sensing protocol (PSP) is designed to efficiently use optical transport and probe signal generation resources. This one-to-many fiber and one-to-many end device system operates in a coordinated fashion according to the probe sensing protocol.

The probe sensing protocol identifies:
what type of probe signal(s) is (are) sent, along with the signal attributes (wavelength, power level, duration, number of probe signals, duty cycle, etc.)
when the probe signals are transmitted
where the probe signals are sent, which is the target probe receiver
which target path the probe signal is sensing (the path traversed)

Therefore, based on the termination system, the fibers and the end devices participating, the probe sensing protocol (PSP) traverses a defined/selected fiber topology to target sensing probe signals to specific areas and/or to reach targeted probe receivers.

Figure 7:
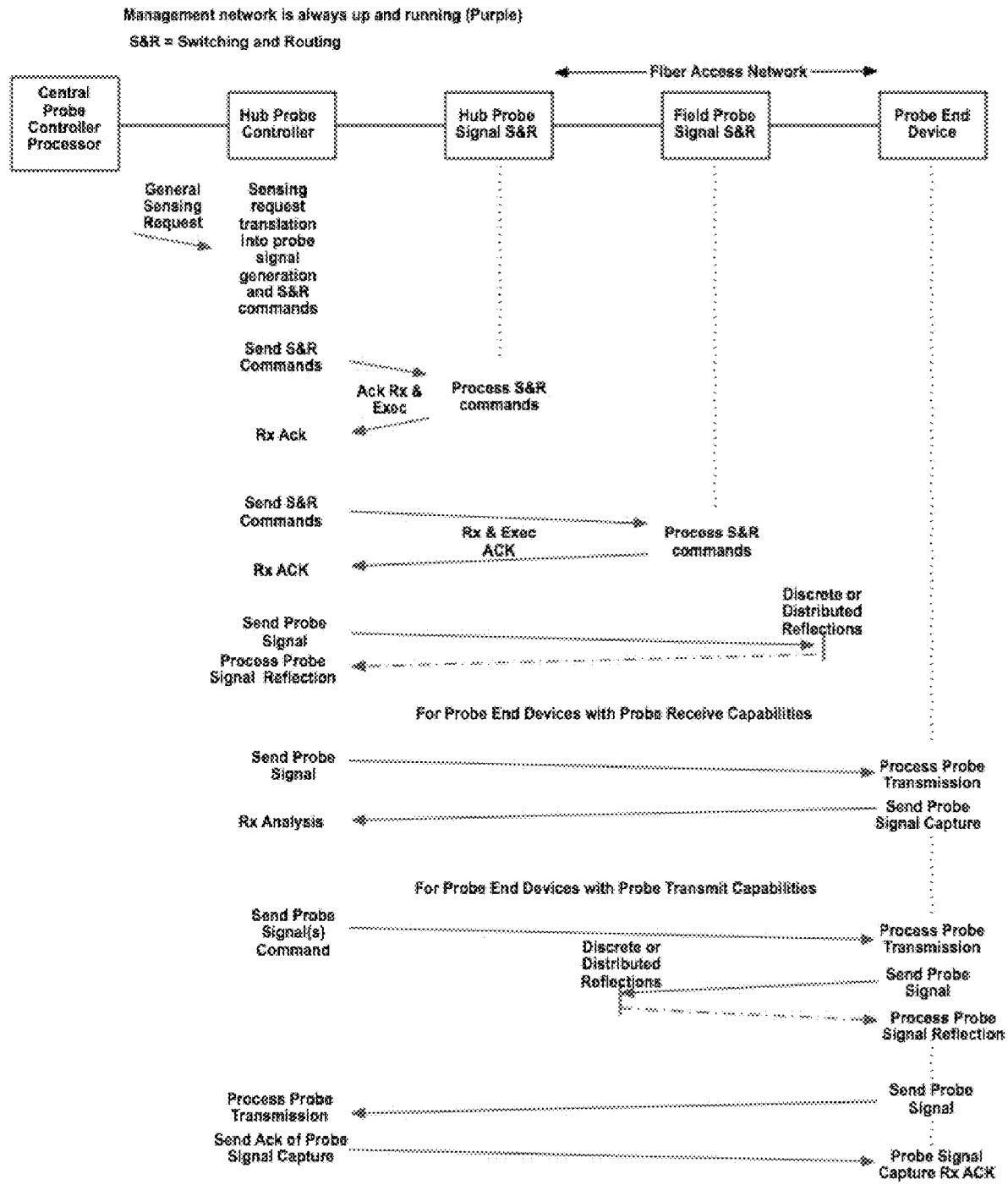
FIG. 7 shows an exemplary probe sensing protocol, according to an embodiment.

The probe sensing protocol depicted in FIG. 7 shows interactions using both the sensing channel and the out-of band (OOB) management channel. The sensing channel is limited to carrying probe signals and their reflections, while the out of band management channel is used to carry the commands that control the channel setup, such as commands to the fiber wavelength switching and routing device that define the fibers in use and the probe signal paths. The out of band management channel also is used to request probe signal transmissions from remote sensing end devices and to provide a time reference to the SEDs so that transmission and reception of signals can be synchronized. One of the main functions of the OOB management channels is to carry the captured probe signal data of the probe signals generated by the STS. The captured probe signals could be processed or partially processed depending on the capabilities of the SED.

Sensing System Functions

The probe sensing system has three modes of operation. In all cases it is assumed that the probe sensing protocol has already enabled the sensing channel.

Figure 8:
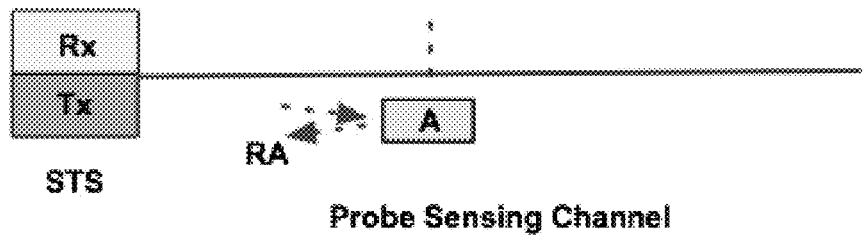
FIG. 8 is a schematic illustrating operation in reflection-only sensing mode.

Reflection-Only Sensing Mode (FIG. 8)—This first mode of operation only requires the sensing termination system (STS) for operation. Here, the STS transmitter sends a probe signal. As this probe signal traverses the probe sensing channel, reflections along the channel occur, which go back to the STS. These reflections are captured by the STS receiver. The captured received probe signal, RA, is processed to sense events and channel conditions along the fiber path. The a priori known transmitter probe signal facilitates the analysis. An alternate implementation of this mode is when the probe signals are sent by the SED probe transmitter, the reflected signals are captured by the SED probe signal receiver (upstream direction) and also processed by the SED. The captured and processed information is sent through the management channel to the STS to communicate results and whether further analysis is needed.

Figure 9:
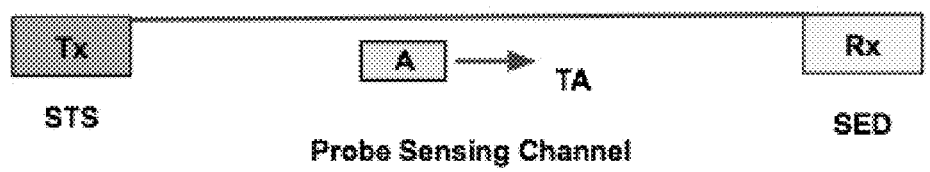
FIG. 9 is a schematic illustrating operation in transmission-only sensing mode.

Transmission-Only Sensing Mode (FIG. 9)—This second mode of operation requires the sensing termination system (STS) and the sensing end-device (SED) for operation. Here the STS transmitter sends a probe signal. As this probe signal traverses the probe sensing channel, it is modified by the events and conditions along the fiber path. The modified transmitted signal is captured by the SED receiver. The captured received probe signal, TA, is processed to determine the events and channel conditions along the fiber path. The SED has a priori knowledge of the transmitted probe signal through management channel communications. An alternate implementation of this mode is when the probe signals are sent from the SED probe transmitter to the STS probe signal receiver (upstream direction).

Figure 10:
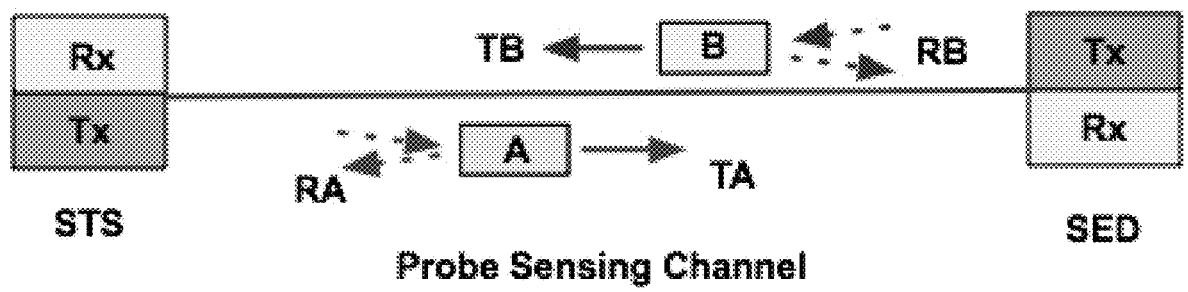
FIG. 10 is a schematic illustrating operation in reflection and transmission sensing mode.

Reflection and Transmission Sensing Mode (FIG. 10)—This third mode of operation is the most elaborate and complete, it requires that both STS and SED have transmit and receive capabilities. It aggregates the previous modes resulting in the generation of a reflection-transmission sensing matrix defined by:

$$\begin{bmatrix} RA & TB \\ TA & RB \end{bmatrix}$$

In passive and non-directional channel scenarios, TA=TB and RA=RB resulting in reciprocal characteristics of the channel. Nevertheless, even in passive systems when high sensitivity is required, reciprocity may not always apply and it may be advantageous to conduct this bidirectional reflection and transmission sensing mode for higher resolution and accuracy. The information that is captured and processed by the SED is sent through the management channel to the STS to communicate results to process together the four sensing parameters (RA, TA, TB, RB).

Probe Multicasting and Coordinated Probe Transmissions

Probe multicasting is a capability that can be implemented based on the type of devices along the fiber path. A splitter or coupler along the fiber path results in the probe signals traversing two or more branches of the fiber path. In the case of a 2-way splitter or a single port coupler the following reflection-transmission matrices are obtained.

$$\begin{bmatrix} RA & TB1 & TB2 \\ TA1 & RB1 & \sim 0 \\ TA2 & \sim 0 & RB2 \end{bmatrix}$$

Figure 11:
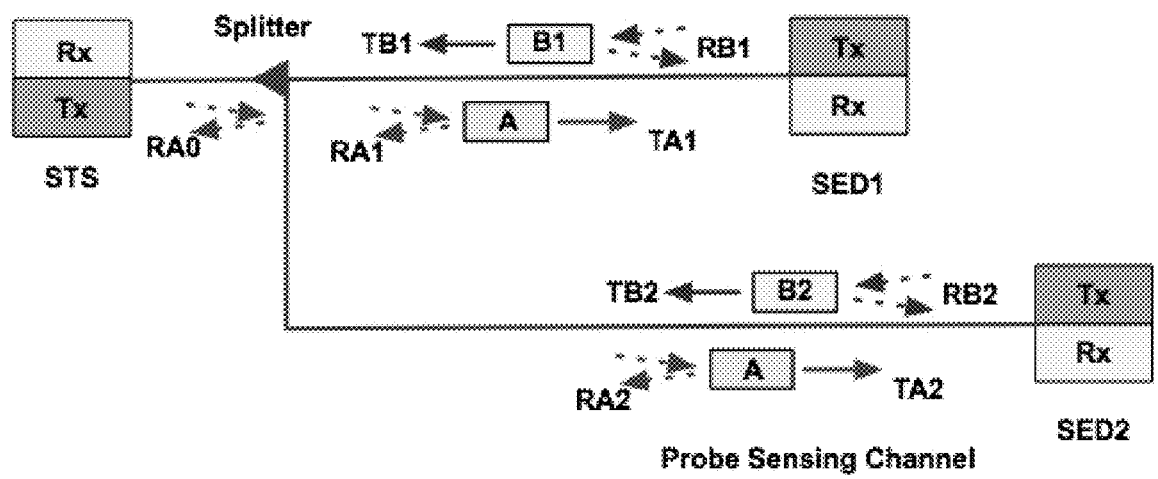
FIG. 11 is a schematic illustrating probe signal multicasting through a splitter.

In this scenario and as shown in FIG. 11, RA=RA0+RA1+RA2, where RA0 are the reflections on the fiber path to the left of the splitter, RA1 are the reflections on the upper fiber path to the right of the splitter and RA2 are the reflections on the lower fiber path to the right of the splitter. Assuming good isolation characteristics in the splitter, transmission characteristics from SED1 to SED2 and vice versa, they are approximated to 0 in the above matrix (~0).

Correlation and Analysis of this Data can be Used to Identify or Verify Fiber Topology Characteristics.

In addition to generating multicasting using passive devices (e.g., splitters and couplers), multicasting can be generated using a multicast wavelength switch if the wavelength S&R device supports that function or multicasting can be emulated by generating two copies of the same probe signal and sending the signal to the fiber paths. This last approach is an example of coordinated probe transmissions.

Figure 12:
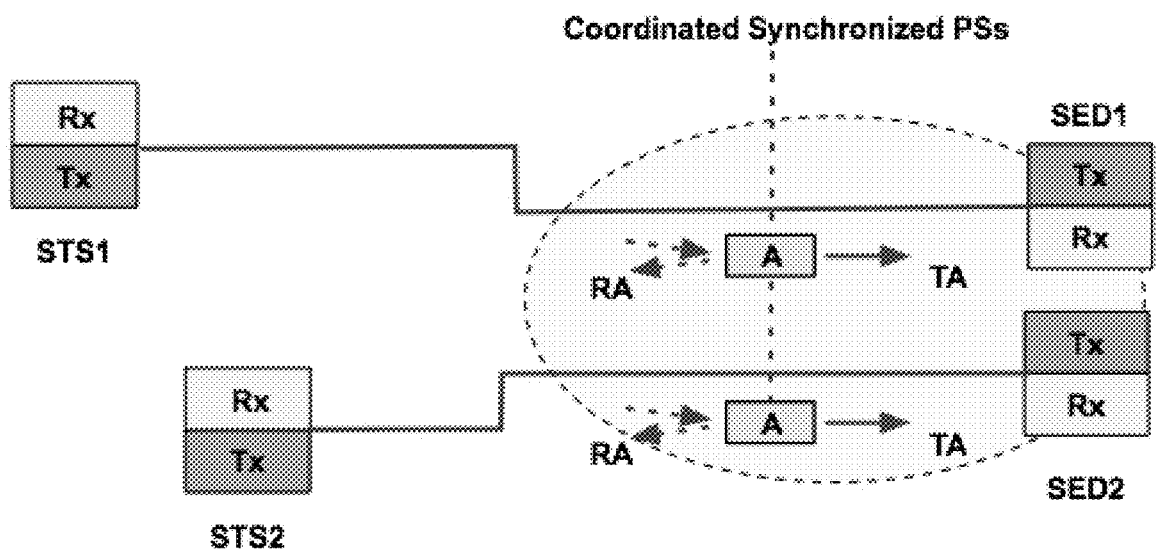
FIG. 12 is a schematic illustrating coordinated/synchronized probe transmissions.

Another example of coordinated probe transmissions can take place when a certain coverage area is to be sensed through coordinated synchronized probes that are sensing the same area at the same time (FIG. 12).

A properly scheduled system can identify the probe signals with a good timing reference and the sensing protocol. Nevertheless, to make sure each probe is identified, an ID or probe signature can be embedded within the probe.

While the topologies shown in FIG. 1 represent typical one-to many fiber topologies typically seen in cable, telco and cellular fiber distribution/access networks, the hybrid telecom-sensing system disclosed herein can also apply in P2P and ring topologies, typically seen in regional and backbone fiber networks, and long-haul networks, such as is the case of subsea communications. In the subsea use case with very long links, the sensitivity for sensing the probe signals may be affected so the system may have to operate just in reflection mode to sense nearby reflections or a larger number of probe signals may be required to improve sensitivity.

Elements of Intelligent Optical Sensing System

Figure 13:
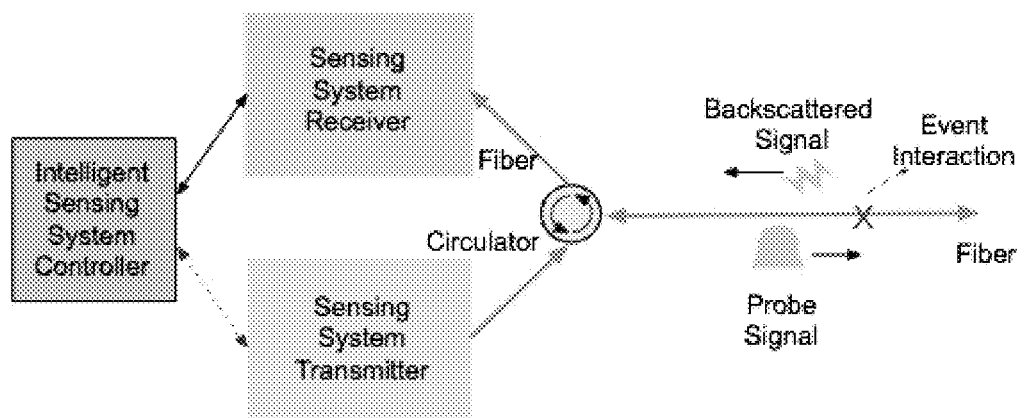
FIG. 13 is a block diagram of an intelligent fiber sensing system, according to an embodiment.

The sensing signal transmitter and receiver are key elements of the optical sensing system. The intelligent optical sensing system receiver and transmitter are controlled by the intelligent system controller where all the probe signals' processing, correlation and analysis take place. On the optical network side, a circulator is used to discriminate the sensing transmit/downlink from the receive/uplink directions (FIG. 13). The intelligent sensing system controller decides what type of probe signals to transmit (including wavelength and other parameters characterizing probe signals), which optical path the probe signals take and when the probe signals are transmitted.

In a one-to-many fiber topology that has ubiquitous fiber coverage, multiple probe signals can be transmitted simultaneously or in sequence and their responses to events analyzed. Network topology is taken into account to determine which fibers are used and when the probe signals are transmitted so that the desired areas are covered for the type of event that is to be sensed. Multiple event types can be sensed simultaneously in the same area by sending multiple probe signals designed for different events. In case these events overlap in time, wavelength multiplexing can be used to avoid interference among the probe signal responses to the events (i.e. backscattered probe signals).

Figure 14:
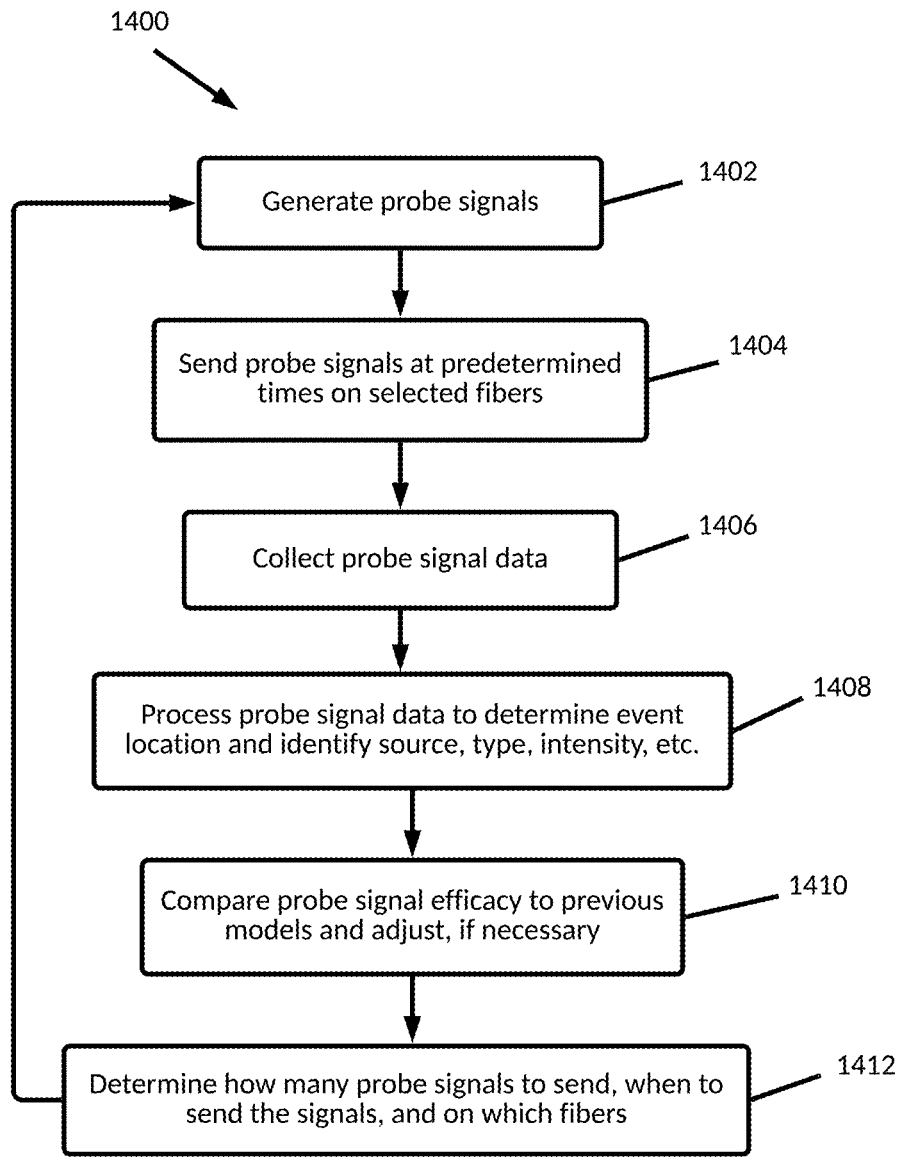
FIG. 14 is a flowchart illustrating steps in a method for training an intelligent distributed fiber sensing methodology for 1-to-many fiber networks.

The disclosed methodology relies on the analysis obtained after backscattered probe signals are correlated and processed. This methodology uses a diverse set of probe signals that facilitate the training and recursive optimization of these probe signals for specific target events. A primary goal is to be able to discriminate as accurately as possible the type of event as well as the characteristics and features of the event. A secondary goal is to optimize the use of resources and maximize coverage and diversity of types of sensing events to minimize implementation and operational costs. FIG. 14 is a flowchart 1400 illustrating steps in a method for training an intelligent distributed fiber sensing methodology for 1-to-many fiber networks. The functions in FIG. 14, performed by the transmitter, are 1402-1402. Step 1406 shows the receiver function and steps 1408-1412 are the controller functions.

Figure 15:
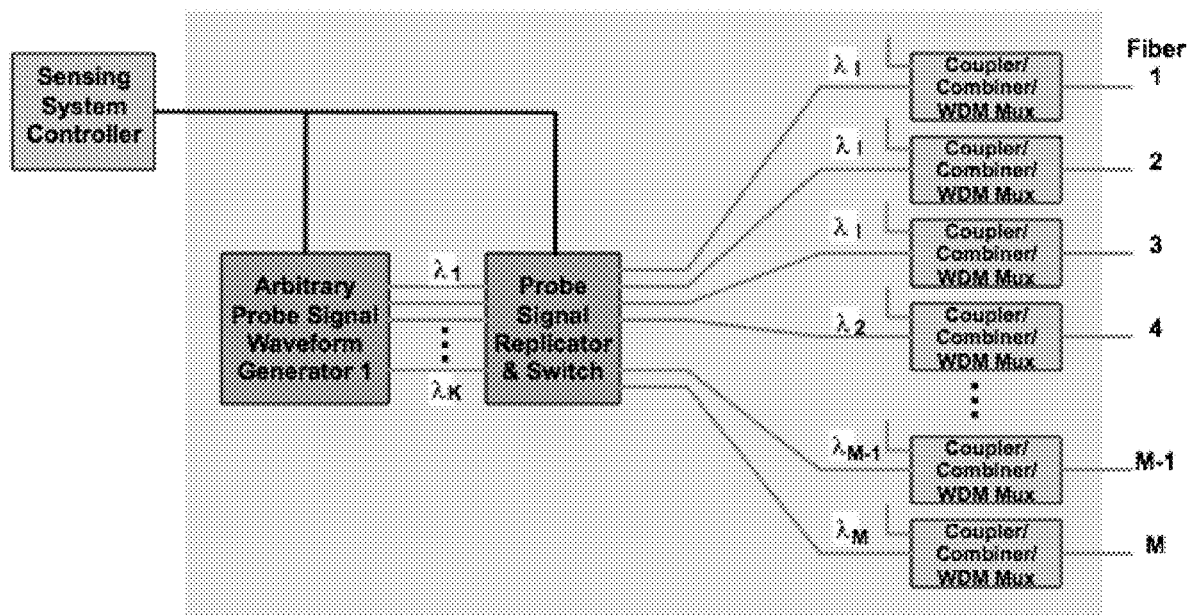
FIG. 15 is a schematic of a fiber sensing system controller and transmitter, according to an embodiment.

Flexibility in the fiber sensing system is achieved through the generation and distribution of probe sensing signals. This flexibility from a probe signal generation perspective, can be implemented using an arbitrary waveform generator that generates probe signals according to the commands of the sensing system controller. From a distribution perspective this flexibility is achieved through the probe signal replicator and switch. These probe signals are subsequently inserted into the traditional telecom fiber-optic network via fiberoptic couplers, splitters/combiners or wavelength multiplexers (FIG. 15). Distribution of these probe signals to the different telecom fibers is also controlled by the sensing system controller. In some scenarios, many fibers may be used to have a dense presence of probe signals, to achieve better correlation, to achieve higher sensitivity and/or to achieve greater resolution of an event location. In other scenarios, the use of fewer fibers may be sufficient to achieve the desired sensing performance. FIG. 15 shows the transmitter and the system controller.

Figure 16:
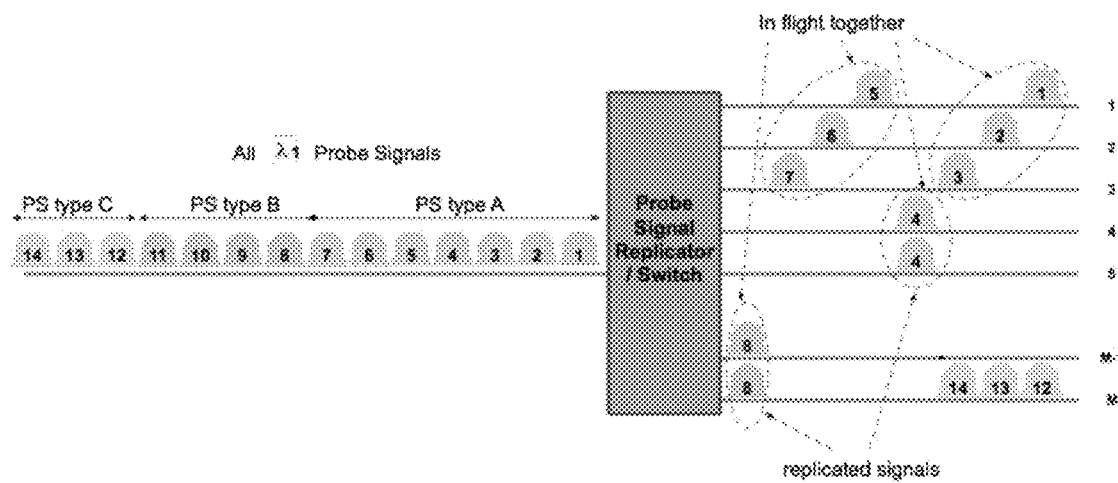
FIG. 16 illustrates a fiber sensing system transmitter element function and exemplary probe signals.

To determine the internal design of the "probe signal replicator/switch", it is best to review its desired functionality by examining the probe signals traversing the input and output ports. FIG. 16 shows this through a single input port example. The input probe signals are manipulated to result in the desired probe signal outputs that will ultimately be inserted into the telecom fiber network.

FIG. 16 shows that some probe signals are time demultiplexed into separate output fibers. Some probe signals can be switched to a designated fiber while some probe signals are replicated and then sent to multiple fibers. The name "probe signal replicator switch" was coined to describe its functionality.

Figure 17:
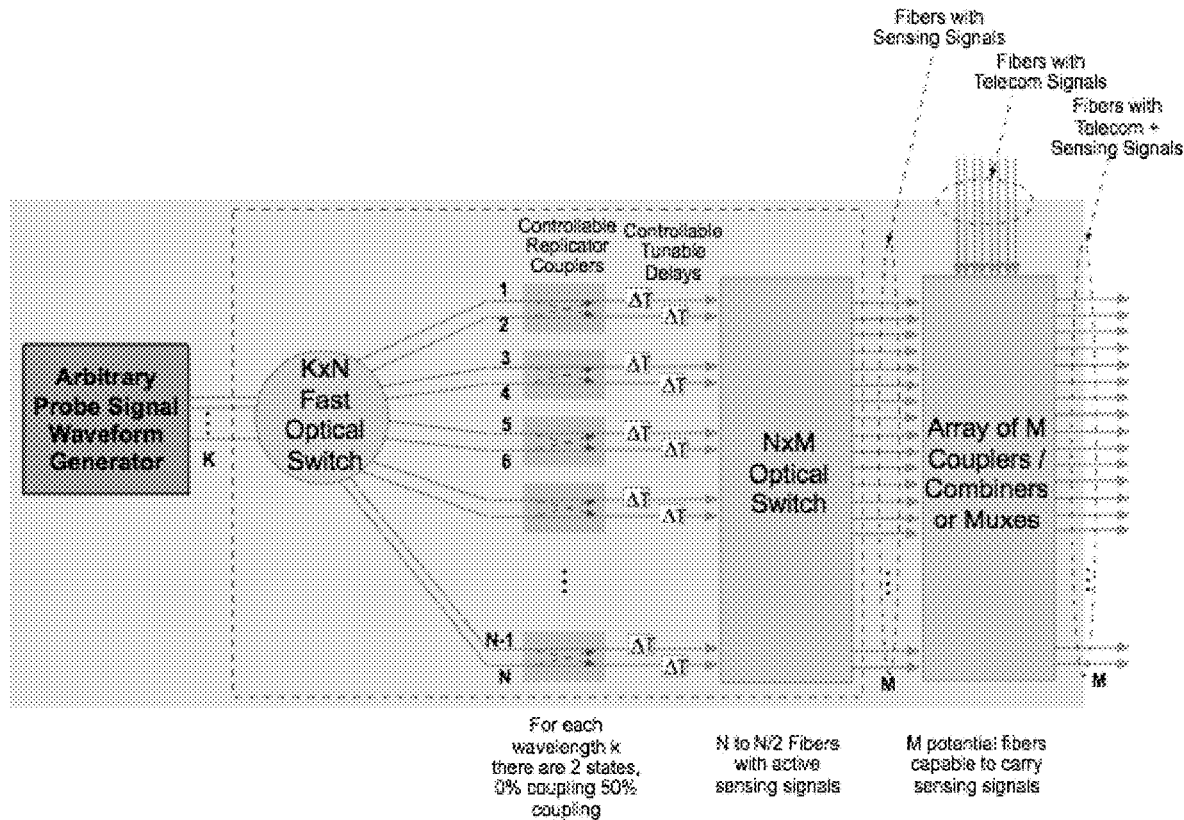
FIG. 17 is a schematic of a fiber sensing system transmitter using replicator couplers, according to an embodiment.

Based on the functions shown in FIG. 16, appropriate components in the "probe signal replicator switch" are introduced to reproduce the intended functionality. One embodiment of this design is shown in FIG. 17 (dashed rectangle).

One embodiment of the "probe signal replicator switch" uses a K×N fast optical switch, where K wavelengths can be dedicated for sensing in order to drive up to N sensing fibers. The K×N optical switch is followed by a bank of controllable replicator couplers. These controllable couplers are 2×2 port devices capable of probe signal replication. There is a time delay section that follows to perform fine time adjustments to make sure probe signals are time coordinated to have the effect of multiple simultaneous probe signals in-flight in the desired locations. In order to select at least "N" fibers to be used from the entire population of "M" fibers that could potentially carry probe signals an N×M optical fiber switch is used. The N×M optical fiber switch does not need fast controllability as it is expected that the selection of N from M total fiber path candidates will be infrequent. A fiber patch panel could replace the switch if manual configuration is deemed suitable.

Figure 18:
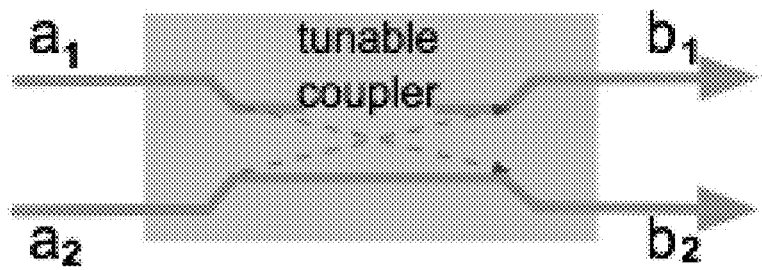
FIG. 18 is a schematic of a tunable/controllable fiber coupler for operation in replication and pass-through modes, according to an embodiment.

The controllable couplers have two input ports ($a_1$, $a_2$) and two output ports ($b_1$, $b_2$). The input ports are driven from optical transmission lines coming from the fast K×N optical switch. In a first mode, for a specific wavelength k, a probe signal entering one of the input ports can is divided equally among its two output ports which describes the replication/duplication method. A second mode of operation of this coupler is when no energy is cross-coupled to the output ports. This means that in this second mode, the energy entering port $a_1$ exits to port $b_1$ and the energy entering through port $a_2$ exits through port $b_2$. In this second mode there is no replication or duplication of the probe signal allowing the probe ($a_1$,$a_2$) signals out of ports $b_1$ and $b_2$ to be different and unique. The first mode for wavelength k is commanded by the coupler control signal $t_{k1}$ while the second mode is commanded by the coupler control signal $t_{k1}$. Since this controllable coupler generates two probe signals (probe signal replication), to achieve greater replication, adding another set of couplers in cascade can achieve 1×4 replication and adding even another coupler section in cascade can achieve up to 1×8 replication. A different signal wavelength would use a different set of parameters $t_{ki}$ that are tuned for that specific wavelength. FIG. 18 shows a tunable/controllable coupler implementation example.

Figure 19:
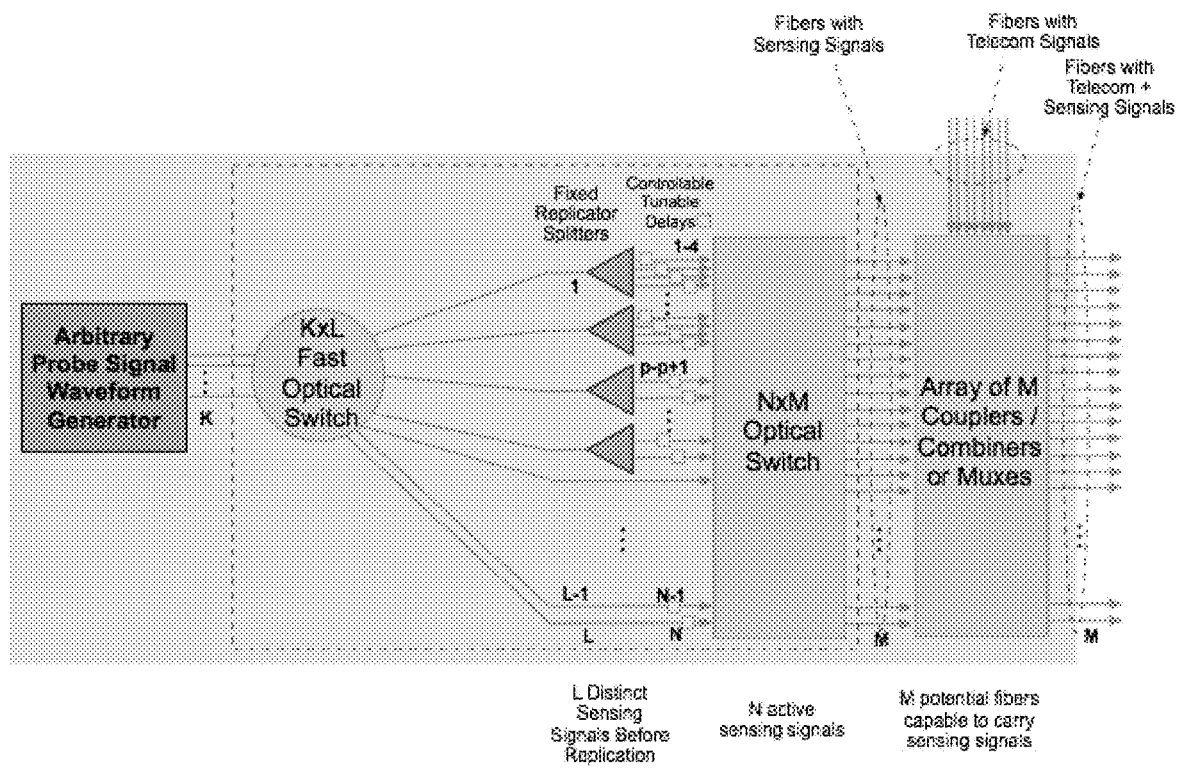
FIG. 19 is a schematic of a fiber sensing system transmitter using fixed replicator splitters, according to an embodiment.

Even though the coupler in FIG. 18 provides flexibility and control, replication can be implemented through other means even though with less flexibility and control. FIG. 19 shows the implementation of signal duplication (x2) and quadruplication (x4) using fixed splitters. FIG. 19 shows 4-way splitters for probe signal quadruplication and 2-way splitters for duplication of probe signals.

Figure 20:
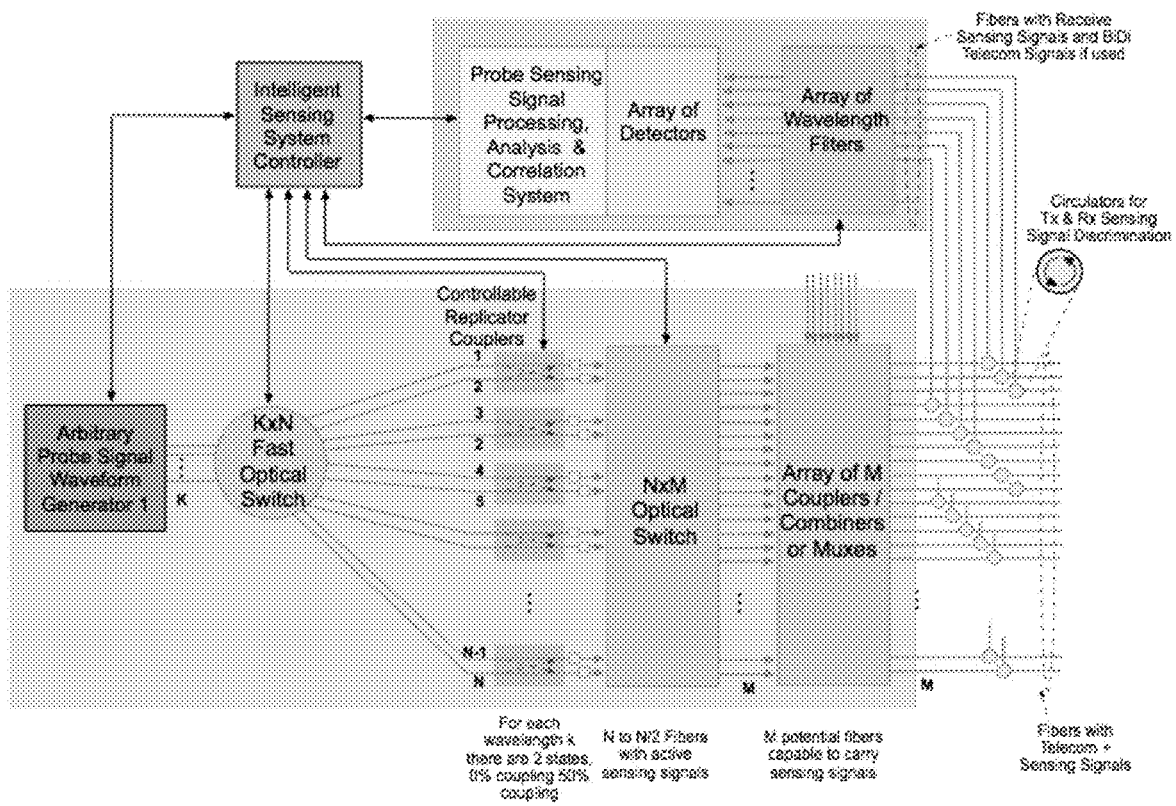
FIG. 20 is a schematic of a fiber sensing system with transmitter and receiver detail, according to an embodiment.

In order to incorporate the transmit and the receive sections of the sensing system, circulators are included at the output of the array of couplers/splitters/multiplexers that combine telecom and sensing transmitter signals prior to exiting to the fiber plant. The receive sensing system includes wavelength filters to select the desired sensing signals for processing. It includes optical-detectors or optical receivers to convert optical signals to the electrical domain for subsequent processing. A processing section to process and analyze and to analyze and correlate multiple probe signal responses from single and/or multiple fiber paths. This processing section also compares and learns from the different "training" probe signals that have been sent so that future probe signals for the different events could be further optimized. The entire sensing system is depicted in FIG. 20.

Implementation of the system depicted in 20 could have certain functionality combined or separate. The controllable replication could be integrated with the delay adjustment or with the fast optical switch. The Intelligent Sensing System Controller is shown to be directly connected to the sensing transmitter and receiver; however, a centralized controller with remote connectivity is also feasible.

Statements Regarding Incorporation by Reference and Variations

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A method of using a telecommunication fiber-optic network as a probe, the method comprising the steps of:
    transmitting at least one coherent telecommunication signal over a first fiber optic strand of the fiber optic network;
    transmitting at least one direct detection probe signal concurrently with the at least one coherent transmission signal, such that the at least one coherent transmission signal and the at least one direct detection probe signal coexist on the first fiber optic strand of the fiber-optic network;
    receiving scattered energy from the at least one direct detection probe signal at a detector;
    analyzing data representing the scattered energy to monitor a first condition affecting the fiber-optic network; and
    determining, a posteriori based on the analyzed data, at least one event associated with the monitored first condition affecting the fiber-optic network,
    wherein the at least one direct detection probe signal is pulsed at a shorter duration and higher power density than the at least one coherent transmission signal.

2. The method of claim 1, wherein the at least one direct detection probe signal is generated by one or more end devices of the fiber-optic network.

3. The method of claim 1, wherein the at least one direct detection probe signal and the at least one coherent telecommunication signal are co-propagating.

4. The method of claim 1, wherein the at least one direct detection probe signal and the at least one coherent telecommunication signal are counter propagating.

5. The method of claim 1, wherein the data represent backscattering of the at least one direct detection probe signal, probe signals received at an end device, probe signals received at a hub from an end device, or a combination thereof.

6. The method of claim 1, further comprising a step of coordinating timing, physical path, overall power level, pulse duration, pulse peak power, and/or wavelength of the at least one direct detection probe signal.

7. The method of claim 1, wherein the condition is internal to the fiber-optic network and/or external to the fiber-optic network.

8. The method of claim 1, wherein the condition is selected from the group consisting of temperature, strain, vibration, refractive index, electromagnetic energy, tensile force, compressive force, physical movement, light scattering, fiber-optic cable damage, and combinations thereof.

9. The method of claim 1, further comprising a step of identifying a characteristic of the at least one event, wherein the identified characteristic at least one of location, type, source, intensity, duration, and combinations thereof.

10. The method of claim 1, wherein the direct detection probe signals are chirped pulses.

11. A hybrid telecommunication and sensing (HTS) system for monitoring a condition affecting a fiber-optic network including a hub connected to a plurality of end devices by a fiber optic cable, the HTS system comprising:
    a probe signal generator configured to transmit direct detection probe signals on a first fiber strand of the fiber-optic network;
    a telecommunication signal transceiver configured to concurrently transmit coherent telecommunication signals on the first fiber strand such that the direct detection probe signals and the coherent telecommunication signals coexist on the first fiber strand;
    a probe signal receiver configured to receive scattered energy from the direct detection probe signals; and
    a processor configured to (a) analyze data representing the scattered energy to monitor a first condition affecting the fiber-optic network, and (b) determine, a posteriori based on the analyzed data, at least one event associated with the monitored first condition affecting the fiber-optic network,
    wherein the direct detection probe signals are pulsed at shorter durations and higher power densities than the coherent transmission signals.

12. The HTS system of claim 11, wherein the probe signal receiver is further configured to receive one or both of backscatter and forward scatter from the direct detection probe signals.

13. The HTS system of claim 11, wherein the processor is further configured to receive the data from one or more of the plurality of end devices through an out-of-band channel.

14. The HTS system of claim 11, wherein the direct detection probe signals are generated by one or more of the plurality of end devices.

15. The HTS system of claim 11, wherein the direct detection probe signals and the coherent telecommunication signals are co-propagated.

16. The HTS system of claim 11, wherein the direct detection probe signals and the coherent telecommunication signals are counter propagated.

17. A non-transitory computer-readable medium having a plurality of non-transitory computer-executable instructions stored therein, the non-transitory computer-readable medium in operable communication with a processor configured to utilize a fiber-optic network as a hybrid telecommunication and sensing system, and the plurality of non-transitory instructions, when executed by the processor, cause the processor to:
    (i) transmit direct detection probe signals and coherent telecommunication signals concurrently such that the coherent transmission signals and the direct detection probe signals coexist on a shared fiber-optic strand;
    (ii) receive scattered energy from the direct detection probe signals at a detector;

(iii) analyze data representing the scattered energy to monitor a first condition affecting the fiber-optic network; and (iv) determine a posteriori based on the analyzed data, at least one event associated with the monitored first condition affecting the fiber-optic network, wherein the direct detection probe signals are pulsed at shorter durations and higher power densities than the coherent transmission signals.

18. The non-transitory computer-readable medium of claim 17, wherein the instructions further cause the processor to transmit control signals associated with the direct detection probe signals in an out-of-band channel.

19. The non-transitory computer-readable medium of claim 18, wherein the control signals are configured to instruct an end device of the fiber optic network to transmit the direct detection probe signals.

20. The non-transitory computer-readable medium of claim 17, wherein the data is received from an out-of-band channel.

21. The non-transitory computer-readable medium of claim 17, wherein the instructions further cause the processor to coordinate at least one of timing, physical path, overall power level, pulse duration, pulse peak power, and wavelength of each of the direct detection probe signals.

\* \* \* \* \*